(12) United States Patent
Nielsen et al.

(10) Patent No.: US 9,545,738 B2
(45) Date of Patent: Jan. 17, 2017

(54) METHOD OF FORMING DEEP-DRAWN PAINT FILM LAMINATED SHEET METAL AND ARTICLES MADE THEREFROM

(75) Inventors: Kent E. Nielsen, Dorchester (CA); Mukesh K. Jain, Dundas (CA); Mohamed Elnagmi, Ancaster (CA); Moisei Bruhis, Ancaster (CA)

(73) Assignees: 3M INNOVATIVE PROPERTIES COMPANY, Saint Paul, MN (US); MCMASTER UNIVERSITY, Hamilton, Ontario (CA)

( * ) Notice: Subject to any disclaimer, the term of this patent is extended or adjusted under 35 U.S.C. 154(b) by 297 days.

(21) Appl. No.: 14/239,586

(22) PCT Filed: Aug. 15, 2012

(86) PCT No.: PCT/US2012/050845
§ 371 (c)(1),
(2), (4) Date: Apr. 11, 2014

(87) PCT Pub. No.: WO2013/028420
PCT Pub. Date: Feb. 28, 2013

(65) Prior Publication Data
US 2014/0242346 A1 Aug. 28, 2014

Related U.S. Application Data

(60) Provisional application No. 61/525,568, filed on Aug. 19, 2011.

(51) Int. Cl.
*B21D 22/20* (2006.01)
*B32B 38/12* (2006.01)
(Continued)

(52) U.S. Cl.
CPC .............. *B29C 43/18* (2013.01); *B21D 22/201* (2013.01); *B21D 22/203* (2013.01); *B32B 3/28* (2013.01);
(Continued)

(58) Field of Classification Search
CPC ..... B21D 22/20; B21D 22/201; B21D 22/203; B21D 24/10–24/14; B32B 38/12; B29C 51/08; B29C 51/087; B29C 43/18
See application file for complete search history.

(56) References Cited

U.S. PATENT DOCUMENTS

| 4,225,553 A | 9/1980 | Hirota |
| 5,093,208 A | 3/1992 | Heyes |

(Continued)

FOREIGN PATENT DOCUMENTS

| CN | 101134217 A | 3/2008 |
| JP | 63104729 A2 | 5/1988 |

(Continued)

OTHER PUBLICATIONS

Bosch, "On the prediction of delamination during deep-drawing of polymer coated metal sheet", Journal of Materials Processing Technology, 2009, vol. 209, No. 1, pp. 297-302.

(Continued)

*Primary Examiner* — Carson Gross

(57) ABSTRACT

A method for painting a complex or compound curved three-dimensional surface of a portion of an article. The method comprises providing a paint film (24); providing sheet metal (26) having opposite major surfaces; laminating the paint film onto a major surface of the sheet metal to form a painted sheet metal laminate (22) comprising a first portion and a second portion; permanently deforming the first portion of the painted sheet metal laminate into a formed portion of the article having a complex or compound curved (Continued)

three-dimensional shape; applying an initial force for securing the second portion of the painted sheet metal laminate during an initial stage of said permanently deforming step; and applying a later force for securing the second portion of the painted sheet metal laminate during a later stage of said permanently deforming step. The later applied force is greater than the initially applied force.

14 Claims, 4 Drawing Sheets

(51) Int. Cl.
    *B29C 43/18*     (2006.01)
    *B32B 3/28*     (2006.01)
    *B21D 24/10*     (2006.01)
    *B29C 51/08*     (2006.01)

(52) U.S. Cl.
    CPC .............. *B32B 38/12* (2013.01); *B21D 24/10* (2013.01); *B29C 51/08* (2013.01); *B29C 51/087* (2013.01); *B32B 2309/12* (2013.01); *B32B 2311/00* (2013.01); *B32B 2605/08* (2013.01); *Y10T 428/24628* (2015.01)

(56) References Cited

U.S. PATENT DOCUMENTS

| | | | |
|---|---|---|---|
| 5,433,099 A * | 7/1995 | Katsuhiro | B21D 24/12 72/347 |
| 5,714,273 A | 2/1998 | Wake | |
| 5,759,477 A | 6/1998 | Yamamoto | |
| 6,090,336 A | 7/2000 | Hirmer | |
| 6,699,566 B2 | 3/2004 | Zeiter | |
| 7,833,380 B2 | 11/2010 | LaFave | |
| 7,853,454 B2 | 12/2010 | LaFave | |
| 8,309,004 B2 | 11/2012 | Pinard | |
| 2010/0139357 A1 * | 6/2010 | Haar | B21D 24/14 72/347 |
| 2011/0027594 A1 | 2/2011 | Johnson | |

FOREIGN PATENT DOCUMENTS

| | | |
|---|---|---|
| JP | 02037922 A2 | 2/1990 |
| JP | 05084525 A2 | 4/1993 |
| JP | 2004298906 A2 | 10/2004 |
| WO | WO 2008/092486 | 8/2008 |

OTHER PUBLICATIONS

Cheng, "Wrinkling behavior of laminated steel sheets", Journal of Materials Processing Technology, 2004, vol. 151, No. 1-3, pp. 133-140.
Hayashi, "Recent trends in sheet metals and their formability in manufacturing automotive panels", Journal of Materials Processing Technology, 1994, vol. 46, No. 3-4, pp. 455-487.
Sherman, "Where the Action is: Decorating with Formable Films", Plastics Technology, Jan. 2004, [retrieved from the internet on Aug. 19, 2011], URL <www.ptonline.com/articles/where-the-action-is-decorating-with-formable-films>, 7 pages.
Weiss, "The Influence of Temperature on the Forming Behavior of Metal/Polymer Laminates in Sheet Metal Forming", Journal of Engineering Materials and Technology, Oct. 2007, vol. 129, No. 4, pp. 530-537.
International Search Report for PCT International Application No. PCT/US2012/050845, mailed on Dec. 11, 2012, 4 pgs.

* cited by examiner

METHOD OF FORMING DEEP-DRAWN PAINT FILM LAMINATED SHEET METAL AND ARTICLES MADE THEREFROM

CROSS REFERENCE TO RELATED APPLICATIONS

This is a national stage filing under 35 U.S.C. 371 of PCT/US2012/050845, filed Aug. 15, 2012, which claims priority to U.S. Provisional Application No. 61/525,568, filed Aug. 19, 2011, the disclosures of which is incorporated by reference in their entirety herein.

The present invention relates to a method of deforming sheet metal laminated with a polymer film, in particular to a method of forming sheet metal laminated with a paint replacement film into a complex three dimensional article, and more particularly to a method of forming paint film laminated sheet metal into complex three dimensional painted body parts (e.g., with compound three dimensional curvatures) of a vehicle (e.g., an automobile, aircraft, watercraft, space craft, etc.), an appliance (e.g., refrigerator, dish or clothes washing machine, oven, stove, etc), or other products. The present invention also relates to the painted complex three dimensional articles (e.g., articles with compound three dimensional curvatures such as, e.g., automobile body panels) that can be made according to the present inventive method.

BACKGROUND

Several paint replacement films, or dry paint films, are commercially available for replacing liquid painting in automotive applications. These paint films are typically die-cut and incorporated on the structure of the automobile as appliqués. Such paint films include those disclosed in U.S. Pat. No. 5,759,477, assigned to Green Tokai Co. Ltd., Method of Making Film Plastic Parts; U.S. Pat. No. 7,833,380 B2, assigned to Laminate Products, Inc., Decorative System Composite and Method; U.S. Pat. No. 7,853,454 B2, assigned to Laminate Products, Inc., Method of Producing a Paint Film Part; U.S. Pat. No. 6,090,336, assigned to Decoma International Inc., Method for Manufacturing an Injection Molded Article with Outer Film Secured Thereto; and Plastics Technology January 2004: Where the Action is: Decorating with Formable Films, by Lilli Manolis Sherman. All of these US patents are incorporated herein by reference in their entirety.

The research activities on polymer coated metals predominantly focus on corrosion protection or corrosive delamination. In view of the inherent mismatch in properties between the polymer films and the metal, far less attention is given to the industrial forming of coated metals by means such as, for example, deep-drawing. Published papers deal with the loss of adhesion and recovery of polymer coated steel and laminated steel sheets sandwiched with a polymer core; however, there is virtually no history for the use of paint film laminated sheet metal in automotive stamping processes to produce complex three dimensional parts.

The author of Plastics Technology January 2004: Where the Action is: Decorating with Formable Films, L. Sherman, describes the advancements in the area of in-mold decorating (IMD) with paint films. This reference focuses on the production of film laminated plastic parts. The article quotes the industry manger at GE Plastics: "Paint line is the biggest investment in an auto assembly plant; it occupies half the plant floor space; and it can generate over 1500 tons a year of VOC's" (volatile organic chemicals).

The authors (page 477) of Journal of Materials Processing Technology 46 (1994) 455: Recent trends in sheet metals and their formability in manufacturing automotive panels, describe the need for development of forming techniques to overcome wrinkling and the deterioration of the appearance of the finished parts, and to increase the formable range. But they do not provide any solutions for satisfying this need.

The authors of Journal of Materials Processing Technology 151 (2004) 133-140: Wrinkling behavior of laminated steel sheets, disclose laminates created from a polymer core and sheets of metal on both sides of the polymer. The authors describe the behavior differences, as compared to homogeneous steel sheets, due to the significant differences in material properties of the steel and polymer.

The authors of Journal of Engineering Materials and Technology October 2007, Vol. 129, page 530: The Influence of Temperature on the Forming Behavior of Metal/Polymer Laminates in Sheet Metal Forming, describe the forming behavior of metal-polymer laminates for which a polymer is sandwiched between layers of metal. Although the constructions offer benefits in terms of weight reduction and vibration damping, when compared to the results for homogeneous metals the constructions are inferior in terms of the tendency to wrinkle.

The authors of Journal of Materials Processing Technology 209 (2009) 297-302: On the prediction of delamination during deep-drawing of polymer coated metal sheet, highlight the value of forming polymer coated sheet metal: decrease the subsequent steps of coating, increase cost savings, and eliminate VOC emissions. They further describe that deep-drawing produces large plastic strain. This strain produces rough surfaces and loss of adhesion, which may further result in delamination. They do not provide any solutions to these problems.

U.S. Pat. No. 4,225,553, assigned to Toyo Seikan Kaisha, Limited, discloses a method of manufacturing low-rigid, wrinkle free articles. The laminate construction cannot be more than 200 microns in thickness and consists of a thermoplastic resin film, aluminum foil, and a heat-sealable resin film. Drawing of this laminate is performed through cold-drawing—without a heating step.

U.S. Pat. No. 5,093,208, assigned to CMB Food can plc, discloses a process for laminating a metal sheet with a non-crystalline polyester film. The construction is useful for drawing into cans.

U.S. Pat. No. 6,699,566 B2, assigned to Alcan Technology and Management Ltd., discloses a process for manufacturing shaped packaging. Cold drawing is used in the process. The claims limit the thickness of the metal layer to 8-150 microns and the thickness of the plastic layer to 12-120 microns.

SUMMARY OF THE INVENTION

Paint film laminated sheet metals are of interest as a replacement for liquid paint finishes in automotive applications as they have the potential to cost effectively achieve good quality, long lasting and aesthetically appealing surfaces on formed parts. There are also potential environmental benefits to using a dry paint film, which include the reduction or elimination of liquid paint lines in automotive manufacturing plants and the reduction in use of polluting lubricants in stamping lines. While the benefits of forming paint film laminated sheet metal are clear, until now the resulting surface appearance of such formed laminates has been inferior as compared to the appearance of pre-cut dry paint films applied onto already formed sheet metal parts (e.g., automobile door B pillars and window sashes). The physical material properties of the steel and polymer film are significantly different; therefore, the desired production of a Class A surface is not achieved due to the formation of unacceptable wrinkling on exposed surfaces.

Various paint replacement films, or paint films, are commercially available and used for replacing liquid paint in coloring the surface of pre-formed sheet metal articles such as, for example, certain body parts of an automobile that are typically difficult to color with liquid paint (e.g., door B pillars and window sashes). Until the present invention, however, no one knew how to successfully form a flat piece of paint film laminated sheet metal into a complex three dimensional shaped article, like the body panel of an automobile, and still retain an acceptable surface quality appearance (e.g., an automotive Class A finish) of the paint film.

In one aspect of the present invention, a method is provided for painting a complex or compound curved three-dimensional surface of a portion of an article. The method comprises providing a paint film; providing sheet metal having opposite major surfaces; laminating the paint film onto a major surface of the sheet metal to form a painted sheet metal laminate comprising a first portion and a second portion; permanently deforming the first portion of the painted sheet metal laminate into a formed portion of the article having a complex or compound curved three-dimensional shape; applying an initial force for securing the second portion of the painted sheet metal laminate during an initial stage of said permanently deforming step; and applying a later force for securing the second portion of the painted sheet metal laminate during a later stage of said permanently deforming step. The later applied force is greater than the initially applied force.

The present invention offers, at least in part, a new clamping force (e.g., blank holder force) control strategy for controlling the paint film material flow and to suppress film wrinkling. This strategy can allow for the production of defect-free, complex or compound three dimensionally deformed (e.g., deep drawn) parts from paint film laminated sheet metals. The ability to design materials or processes that allow for the production of Class A finishes, through deep drawing and other such procedures, will provide significant advantages to the metal forming industry. There is significant commercial advantage to automotive and industrial businesses, which target the replacement of liquid paint with paint replacement films for coloring and/or protecting articles.

These and other aspects, features and/or advantages of the invention are further shown and described in the drawings and detailed description herein, where like reference numerals are used to represent similar parts. It is to be understood, however, that the drawings and description are for illustration purposes only and should not be read in a manner that would unduly limit the scope of this invention.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a nanoparticle that comprises "a" fluorescent molecule-binding group can be interpreted to mean that the nanoparticle includes "one or more" fluorescent molecule-binding groups.

As used herein, "a," "an," "the," "at least one," and "one or more" are used interchangeably. Thus, for example, a nanoparticle that comprises "a" fluorescent molecule-binding group can be interpreted to mean that the nanoparticle includes "one or more" fluorescent molecule-binding groups.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "Class A" surface is often used in automotive design to describe a set of freeform surfaces of high efficiency and quality. A freeform surface is used in computer aided design (CAD) and other computer graphics software to describe the skin of a 3D geometric element. Freeform surfaces do not have rigid radial dimensions, unlike regular surfaces such as planes, cylinders and conic surfaces. They are used to describe forms such as car bodies and boat hulls. In a Class A surface, the curvature of the surface is designed to be continuous in each direction, meaning that each point along a common line should have the same radius of curvature. Class A parts can have textured finishes, and they are designed with curvature and tangency alignment to near perfect reflection quality.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The invention may be more completely understood and appreciated in consideration of the following detailed description of various embodiments of the invention in connection with the accompanying drawings, in which.

DETAILED DESCRIPTION OF CERTAIN EMBODIMENTS

Figure 1A:
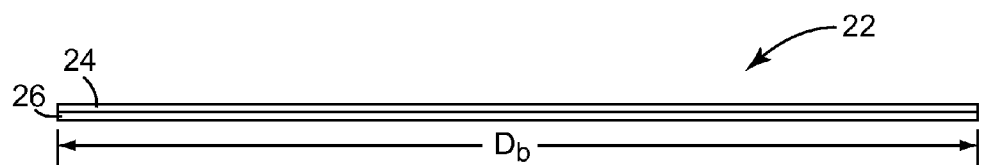
FIG. 1(a) is a side view of a disc-shaped paint film/sheet metal laminate blank used in accordance with the present invention.

In describing the below embodiments of the invention, specific terminology is used for the sake of clarity. The invention, however, is not intended to be limited to the specific terms so selected, and each term so selected includes all technical equivalents that operate similarly.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

EXAMPLES

The following examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

Materials

The exemplary components of the present inventive laminate included as-received bare 304 Stainless Steel (304SS) sheet metal, with a gauge thickness of about 0.6 mm. This sheet metal was purchased from Central Steel and Wire Company, Chicago, Ill. A variety of polymeric paint replacement films were provided from 3M Company. They included:

9000J—3M™ Paint Replacement Film FPW9000J, a high gloss, black polyolefin polyethylene/polypropylene (PE/PP) copolymer paint film, 5 mils thick and backed with an acrylic pressure sensitive adhesive, from Sumitomo 3M Limited, Setagaya-ku, Tokyo.

FRA-0045—3M™ Paint Replacement Film FRA0045J is a matte black polyvinylchloride (PVC) paint film, 5.6 mils thick and backed with an acrylic pressure sensitive adhesive, from Sumitomo 3M Limited, Setagaya-ku, Tokyo.

210-420—3M™ Scotchcal™ Deluxe Silver Graphic Film 210-420, a 4 mil thick PVC pressure sensitive adhesive-backed paint film, silver graphic film.

10 BDC—a 2 mil thick polyurethane paint film backed with an acrylic adhesive and made according to US 2011/0027594 A1: PAINT FILM COMPOSITES AND METHODS OF MAKING AND USING THE SAME, which is incorporated herein by reference in its entirety, and made by 3M Company, St. Paul, Minn.

These paint films are referred to herein as film A=9000J, film B=10 BDC, film C=FRA-0045; and film D=210-420.

Preparation of Sample Paint Film/Sheet Metal Laminates

Circular blanks of the sheet metal having four different diameters (3.5, 4.5, 5.5 and 6.5 inches) were utilized as substrates for the paint film laminated sheet metal samples subjected to axisymmetric deep-drawing experiments. All sample sheet metal blanks were cut by a water jet machine and all sharp edges were deburred and polished by using a rotary grinder. The steel blanks were laminated with films A-D using a commercial roll laminator (Cheminstruments, Mentor, Ohio) which provided air pressure for lamination. All sample sheet metal blanks were laminated at room temperature under the same conditions to produce the exemplary paint film laminated sheet metal samples. Each sheet metal substrate was passed only once through the gap between the rollers and were kept parallel to the initial rolling direction of the sheet metal. The gap between the rolls was set at 80% of the combined thickness of sheet metal and the paint film layer. All of the sample paint film/sheet metal laminates were held under ambient conditions for 72 hours after lamination to allow for stabilization of the deformed polymer layer.

While the above described samples only utilize about 0.6 mm thick sheet metal and about 0.140 mm thick adhesive-backed film (i.e., a film about 0.107 mm thick and an adhesive layer about 0.035 mm thick), it is believed that laminates made with much thicker sheet metal substrates and much thicker paint films would produce similar results, since the sheet metal does not undergo much wrinkling during the forming operation. Typically in automotive applications, the steel sheet metal used for stamping or otherwise forming body panels and other body parts have thicknesses in the range of from about 0.6 mm up to and including about 1.2 mm, and the aluminum sheet metal used is typically thicker (e.g., from about 0.9 mm up to and including about 2 mm). Even thicker sheet metal gauges are used for automobile components other than body panels such as, for example, door or hood inner panels. The thickness of the sheet metal will largely depend upon the particular requirements (e.g., material strength, material density, part weight limitations, stiffness, cost and other considerations) of the application in which the sheet metal is used. The present invention may be used in a number of potential applications currently using sheet metal that is significantly deformed (e.g., punched, stamped or otherwise formed) into complex or compound three dimensional curves and/or shapes and then painted or colored using conventional liquid paint. These applications include automobile, aircraft, watercraft and appliance painted body parts.

Experimental Deep Drawing Procedure

Figure 1B:
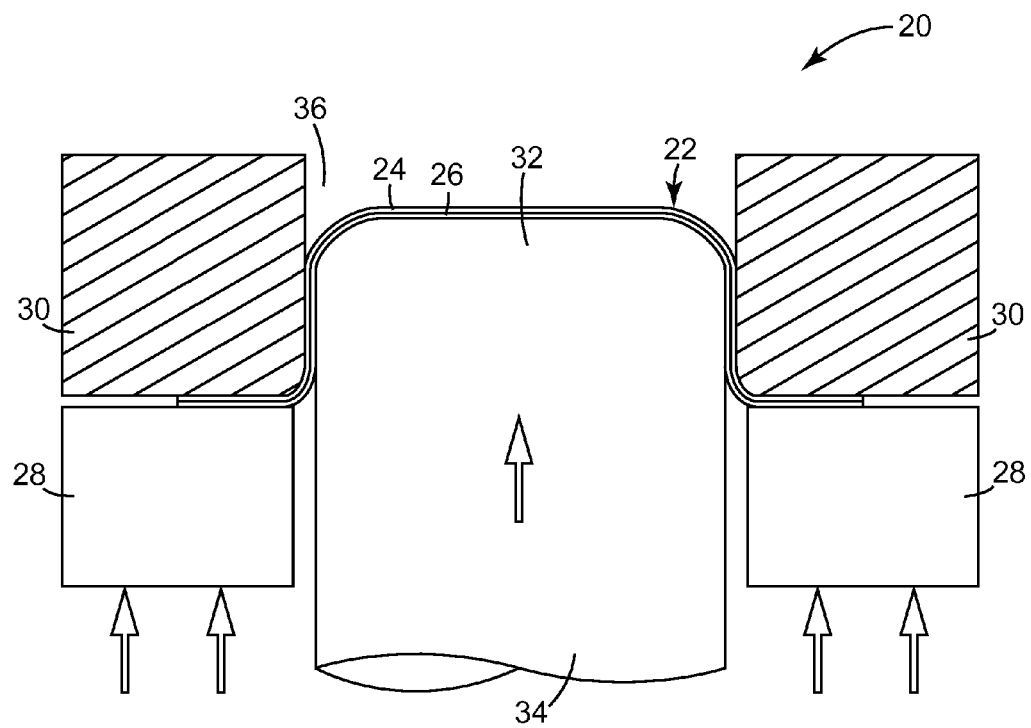
FIG. 1(b) is a schematic partially crossectioned side view of an apparatus for deep drawing a laminate blank in accordance with the present invention.

A schematic of conventional equipment 20 for deep drawing sheet metal is shown in FIG. 1(b) with the present inventive laminate, in the form of a laminate blank 22 consisting of a paint film 24 adhered to a piece of sheet metal 26, being shown instead of a piece of convention sheet metal (see FIG. 1(a)). The blank 22 is a circular shaped disc with a diameter $D_b$. The equipment 20 includes a blank holder 28 with a top surface on which the blank 22 rests, a matching die 30 disposed above the holder 28, and a punch 32 used to deform the sample blanks 22. The blank holder 28 has a centrally located opening through which the punch 32 is actuated. The punch 32 is mounting on the leading end of a punch actuating shaft 34 that moves the punch 32 up and down. The die 30 includes a die cavity 36 through which the punch 32 forces the blank 22. The laminate blank 22 is disposed between the holder 28 and die 30 so that the metal side 26 is in contact with the punch 32 during the deep drawing process. The blank 22 is compressed or clamped between the holder 28 and die 30 with sufficient force to allow the punch 32 to force a central portion of the blank 22 to deform or draw into the die cavity 36. The deep drawing for each of the different laminate samples (A, B, C, and D) were performed on a MTS mechanical testing machine fitted with two servo-controlled actuators (not shown) for controlling movement of the punch shaft 34 (and punch 32) and die 30 toward and away from each other. The blank holder is kept relatively stationary during the process. The capacity of the MTS test system was limited to 25,000 lbf force and a maximum stroke of 6 inches for both actuators. The upper actuator system, attached to the die 30, allowed a close control of the clamping force of the die 30 against the holder 28 during the forming process, while the lower actuator system, attached to the punch shaft 34, allowed displacement of the punch 32 to be controlled. The sample laminate blanks 22 were clamped between the holder 28 and die 30 up to a clamping load of 14,000 lbf based on an optimized blank holder force profile, as discussed later. The drawing experiments were performed at a speed 0.01 inch per second (or 15 mm/min) up to the chosen cup height. Punch load versus displacement data was continuously recorded during the test.

Modifications of the Conventional Drawing Equipment

Figures 2A, 2B:
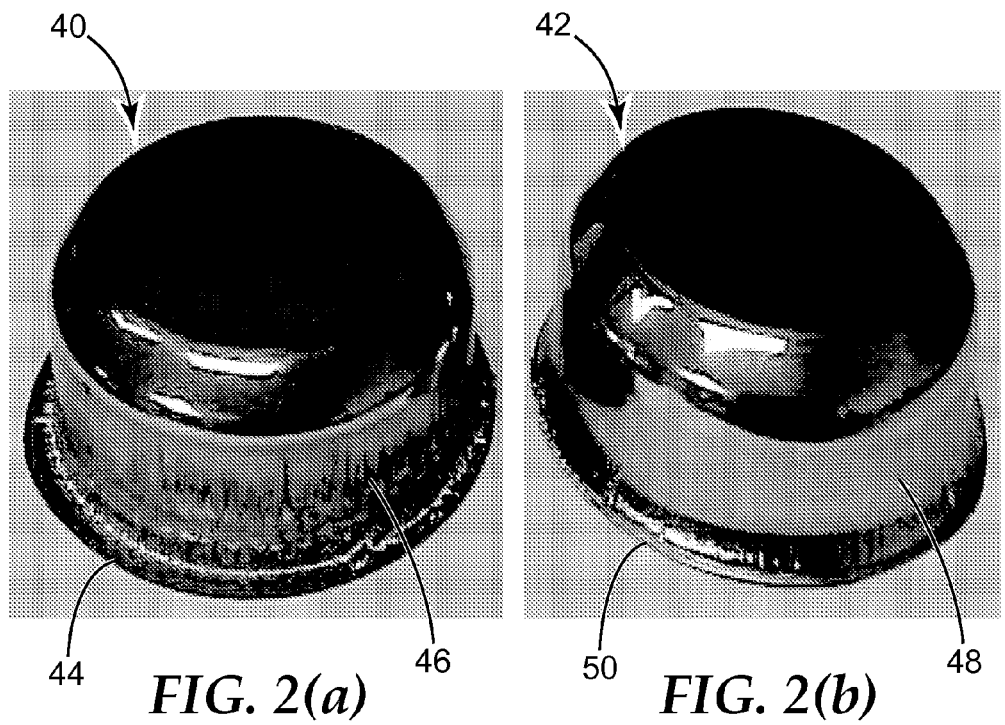
FIGS. 2(a) and 2(b) are photographs of two of the same type laminate samples, with one sample deformed using conventional clearances and the other sample deformed using modified clearances, between the punch and die cavity.
Figures 2C, 2D:
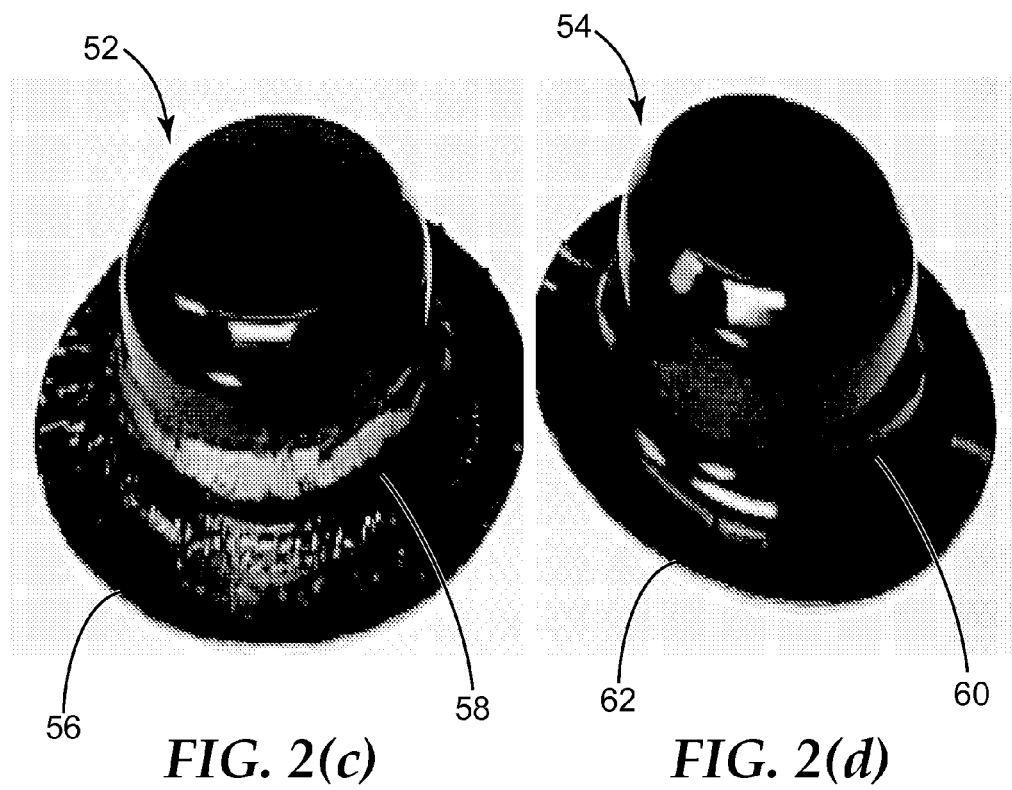
FIGS. 2(c) and 2(d) are photographs of two of the same type alternative laminate sample, with one sample deformed using conventional clearances and the other sample deformed using modified clearances, between the punch and die cavity.

It was discovered that wrinkling and wall friction of deformed laminate samples could be reduced by making modifications to the drawing die. In particular, the clearance between the die cavity or opening and the punch was increased to reduce the friction between the laminated paint film and the die. Typically the clearance between a punch and the corresponding die cavity or opening in most conventional sheet metal cup drawing operations is in the range of from 107% to 115% of the sheet thickness. It has been found that this range was unsatisfactory for the paint film laminated sheet metal samples, because such conventional clearances could result in wrinkling and tearing of the paint film. It has been discovered that appropriate clearances for at least some paint film laminates fall within the range of from about 180% up to and including about 205% of the total laminate thickness. The comparisons of deformed cup-shaped laminate samples 40 and 42, before and after this modification, are shown in FIGS. 2(a) and 2(b), respectively. Samples 40 and 42 are made with a sheet of 304 stainless steel (304SS) laminated to paint film D. As can be seen in FIG. 2(a), the cup-shaped sample 40, deformed with conventional clearances, exhibited wrinkling of the paint film surface at its flange region 44 and side wall 46. As can be seen in FIG. 2(b), the cup-shaped sample 42, deformed with modified clearances, exhibited no wrinkling of the paint film surface at its side wall 48 and only slight wrinkling at its flange region 50. The comparisons of alternative deformed cup-shaped laminate samples 52 and 54, before and after this modification, are shown in FIGS. 2(c) and 2(d), respectively. Samples 52 and 54 are made with a sheet of 304SS laminated to paint film A. As can be seen in FIG. 2(c), the cup-shaped sample 52, deformed with conventional clearances, exhibited wrinkling of the paint film surface at its flange region 56 and side wall 58. As can be seen in FIG. 2(d), the cup-shaped sample 54, deformed with modified clearances, exhibited no wrinkling of the paint film surface at its side wall 60 and only slight wrinkling at its flange region 62.

It has also been found that using a lubricant between the surface of the die and the laminated paint film can help maintain the surface appearance of the paint film subjected to such forming operations. The use of a lubricant can helps in two ways. First, the use of a lubricant can reduce the friction between contacting surface of the die cavity or opening and the laminated paint film, as well as between contacting surfaces of blank holder and the laminated paint film, which can improve the so-called drawability of the paint film laminated sheet metal. Second, using a lubricant can minimize direct contact between the surface of the laminated paint film and the surfaces of the die cavity or opening and the blank holder. Such hydro-dynamic lubrication can reduce surface damage to the paint film during the deep drawing process. Such surface damage is typically in the form of visible surface scratches (in the worst case) and can also reduce the color and gloss level of the paint film.

Because its surface will be exposed, the appearance of the paint film is important. For example, most automobile original equipment manufacturers (OEMs) require their painted body surfaces to exhibit a Class A finish and to have a minimum gloss level and distinctness of image (DOI). It has been found that the surface finish of the die cavity or opening can affect the surface appearance of the laminated paint film. The surface appearance (e,g, surface roughness) of the die cavity or opening can affect the surface of the paint film, because the surface of the laminated paint film contacts and slides across the surface of the die cavity or opening. The surface finish of the punch is not as critical, because the punch only contacts the sheet metal. If the die surface is very smooth (e.g., a polished surface), the frictional forces between the paint film and the die cavity or opening will be lower, which can result in the surface finish of the paint film being better. Typically, the die surface can be specified at the time of machining of the die by specifying the average roughness value (specified by symbol R subscript a or $R_a$). The lower the average roughness value the smoother is the surface finish (but higher is the machining cost of the die). A good general rule may be to have the average surface roughness of the die surface an order of magnitude smaller than that of the sheet metal surface. Rolled sheet metal surfaces typically have average surface roughness in the range of from about 0.3 to about 0.7 micrometers. Because the paint film will be contacting the die surface and the punch will be contacting the sheet metal, high gloss (low average roughness) die surface and a low gloss (high average roughness) surface for the punch will provide better results than vice versa for deep drawing operation.

Process Optimization for Drawing Operation

In an effort to produce a complex or compound three dimensionally deformed (e.g., cup drawn) paint film laminated sheet metal that is substantially free of surface defects, an optimization strategy for the forming process was developed. As used herein, a paint film laminated sheet metal is considered substantially free of surface defects, when there are either no surface defects or any surface defects present are not visible with an unaided human eye having normal 20/20 vision. During the exemplary cup drawing testing, each sample laminate blank 22 was clamped between the blank holder 28 and die 30 (see FIG. 1(b)) with the punch 32 contacting the exposed underside of the sheet metal 26 and the paint film 24 contacting the surface of the die 30. Typically, and as conventionally practiced in the industry for cup drawing of sheet metal, a constant blank holder force is applied during the cup drawing process. Choosing the blank holder force to apply involves balancing competitive issues. An excessive blank holder force will reduce the metal flow into the die, which can result in fracture or tearing of the metal at the punch profile radius. But, not applying enough blank holder force will lead to wrinkling of the metal flange.

Figure 3:
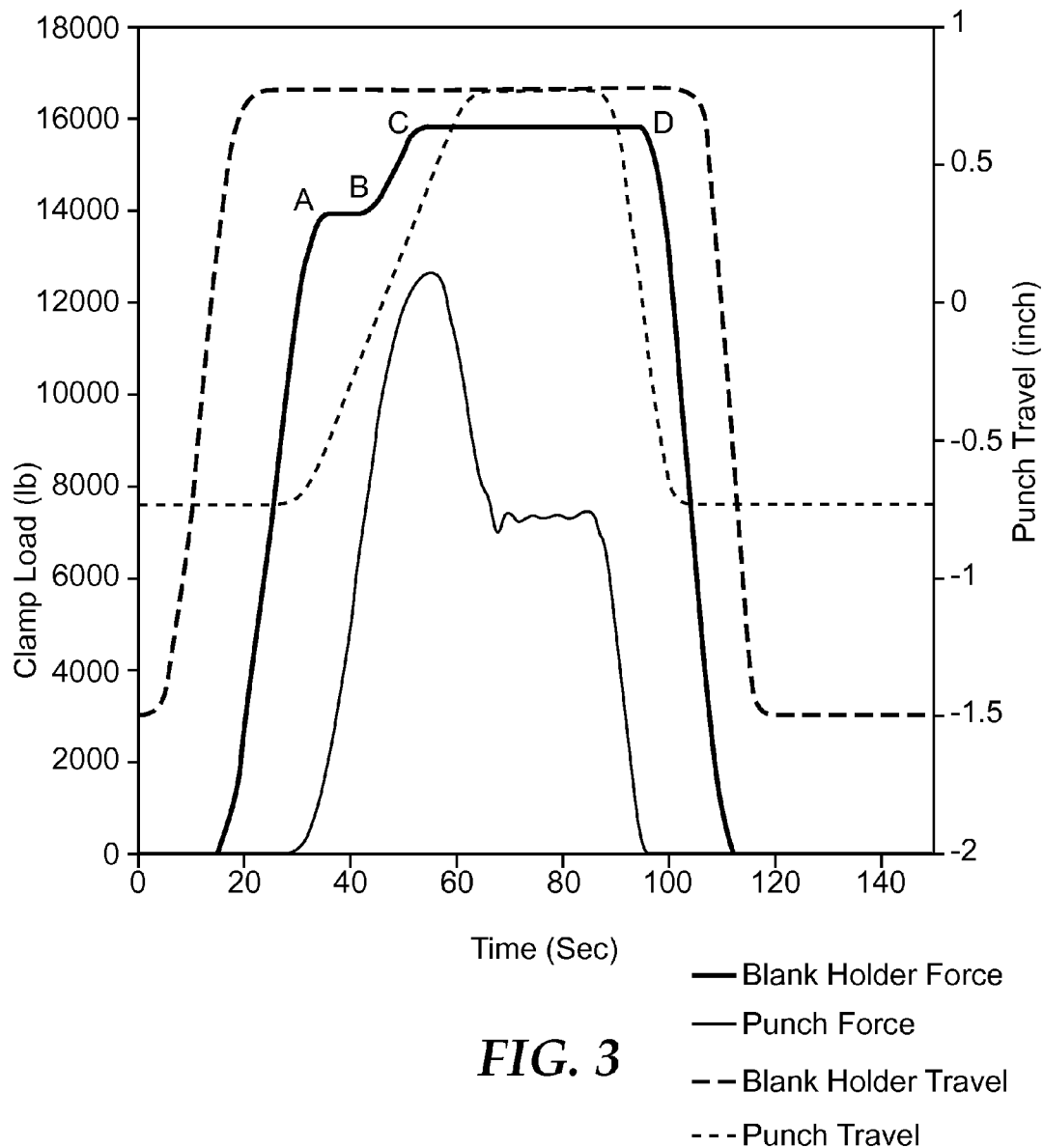
FIG. 3 is a graph showing the time history of various process parameters during exemplary cup drawing.

The present invention provides an optimized drawing procedure that involves applying a modified blank holder force profile. Instead of using a constant applied force, the blank holder force is linearly increased before the punch reaches the maximum force applied. FIG. 3 shows the load history of punch and blank holder for the cup drawing test. Referring to the thick solid black line for blank holder force and the thin solid black line for the punch force, one observes that blank holder force is initially held constant (segment AB of the thick black line) at about 14,000 lbf to suppress wrinkling and still allow the flange to be drawn into the die cavity. However, once the punch displacement is initiated and the punch force starts to rise rapidly, the blank holder force is further increased (segment BC of the thick black line). This change in blank holder force part-way through the cup drawing process enabled further suppression of the wrinkles in the flange while still allowing for the laminate material to flow into the die cavity or opening. The blank holder force was then held constant while the punch load dropped for the remaining stroke of the punch. The optimized blank holder force profile resulted in improved cup drawing to different heights of 0.5 inch, 0.75 inch, 0.9 inch, 1.2 inch, 1.5 inch and 2.3 inch.

The blank holder force is increased, from its initial value, before the punch reaches its maximum applied force or displacement. The results obtained indicate there is an optimum point or range during the forming operation that is the best time for increasing the blank holder force. For complex or compound three dimensional forming operations, or at least a punching operation, this point appears to be in the range between when the punch has reached about 25% ($1/4^{th}$) to 33.33% ($1/3^{rd}$) of the punch stroke or displacement (i.e., the overall distance traveled by the punch after making contact with the laminate blank).

If the force used to clamp the paint film laminate in place (e.g., the blank holder force) is kept at a high value throughout the forming process, the laminate material in the flange region will not flow as well into the die cavity or opening, which can result in a failure of the formed laminate (e.g., tearing and/or wrinkling of the paint film) early in the forming process. It is believed that the use of lower initial clamping forces (e.g., blank holder forces) allows for the paint film material to flow into the die cavity or opening to prevent failure of the film and to increase the degree of deformation (e.g., cup height) attainable. Increased clamping force at a later stage in the process largely suppresses wrinkling of the paint film in the area of major deformation (e.g., at the cup wall) as well as significantly reduces the wrinkling of the paint film at the flange. For the exemplary forming operation, the initial blank holder force was about 90% of the total blank holder force used in the experiments.

Aging and Characterization

After the cups were stored under ambient conditions for two months, the wrinkling tendency of different films on the 304SS substrate was evaluated. The 304SS/film A laminate showed that delamination started at the machined edge of the cup drawing. Micro-wrinkles were observed on the cup wall close to the edge in 304SS/Metallic film cups over time. On the other hand, no changes in 304SS/film B and 304SS/film C cups were observed over time. These results indicate that some film types/compositions (e.g., film B and film C) are more suitable for use in a complex or compound three dimensional forming operation (e.g., cup drawing).

Wrinkling and Tearing of Laminated Films During Cup Drawing

While wrinkling was significantly reduced using the above optimized profile, wrinkles still formed in the flange area of some samples such as, for example, those drawn to a height of 1.5 inch, and along the cup wall for some samples such as, for example, those drawn to a height of 2.3 inch, during the test and subsequently over time. Different methods were researched to suppress wrinkle formation in the film after cup formation. Three solutions were proposed and tested to stop wrinkles after the cup drawing test.

(1) The film at the edge of the flange was cut away from the laminate before the cup drawing test as shown in FIG. 6*a*. When wrinkles in the paint film were observed after removal of the laminate sample from the test system, the paint film was cut with a knife through to the underlying sheet metal at the advancing front of wrinkles along the cup wall.

(2) The clearance between the punch and die was reduced at the top of the cup wall to increase friction. This experiment resulted in the film undergoing large shear deformation thereby 'fusing' to the sheet metal substrate, which suppressed the onset and development of wrinkles.

(3) The cup, once drawn and removed from the test system, was machined to remove the flange and adjacent regions of the cup wall.

Grid Imprinting for Strain Measurement

Bare 304SS specimens were electrochemically etched with a periodic grid pattern of solid circles or dots prior to testing. The center-to-center spacing of the solid circles was kept at 2 mm. The pattern was applied using a grid stencil placed on the metal surface. An absorbing cotton pad was soaked with an electrolytic solution (Electrolyte 53NC) which was placed on top of the grid. Any exposed surfaces in contact with the solution became oxidized when current (15-20 amps) was passed through the sheet metal which produced the dot pattern. For laminated specimens, regular dots were imprinted by first applying a precise plastic mask with periodic circular holes (a distance of 3 mm center-to-center) to the polymer side of the specimen and then applying ink through the holes in the mask using an air brush. During the deep drawing process, the dot pattern is distorted as it deforms with the laminate. An ARGUS optical system uses the change in separation distance between the circular dots to measure the strain distribution on the specimen at the end of the process. After the test, an ARGUS camera is utilized to take a series of photographs of the deep drawing specimen from different angles and point of view. The software then calculates the relative distance between the centers of dots and strain over the deformed region by comparing the deformed and initial grid spacings.

Strain Distribution Measured Over Formed Cups

Figure 4:
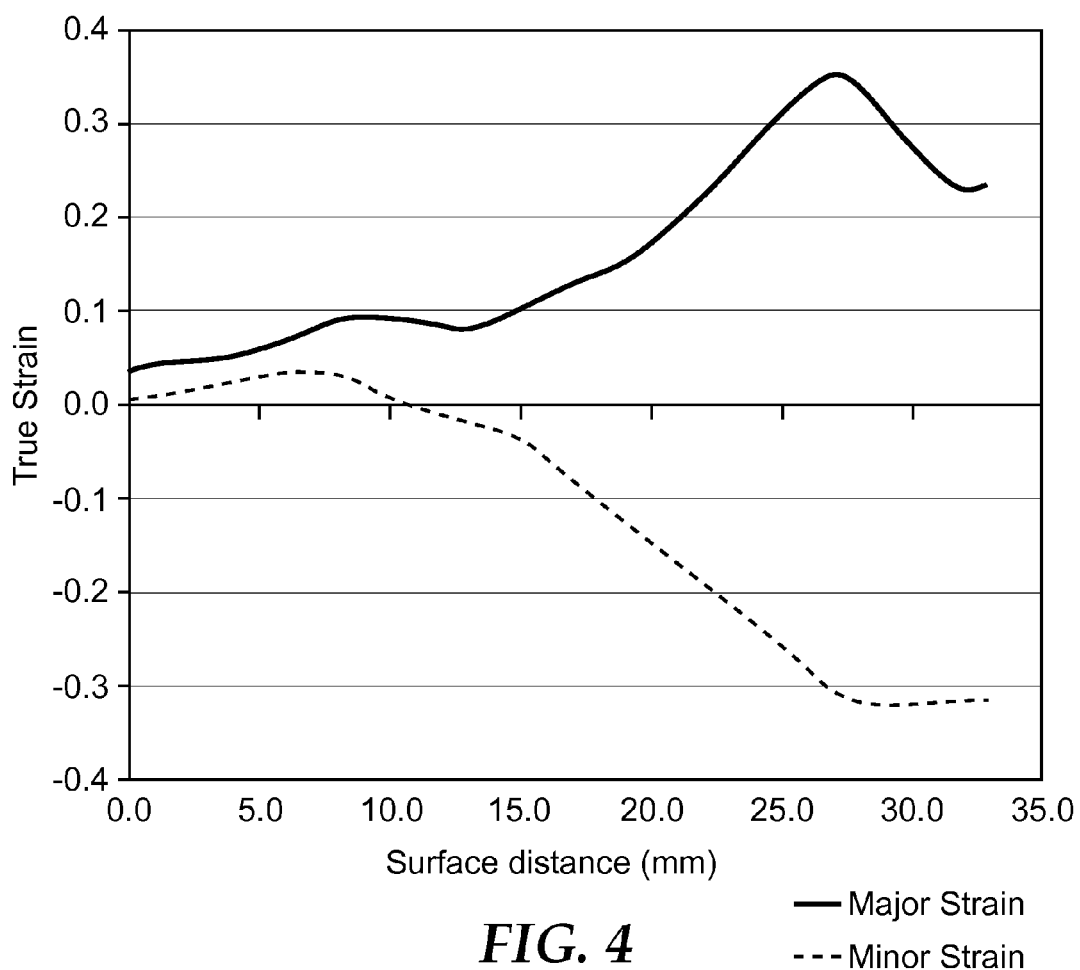
FIG. 4 is a plot of the major and minor strain distribution over a sample deformed cup surface along a line from the cup flange up the cup wall to the top of the cup.

Once the cup drawing tests were performed for different blank diameters with periodic grids, a strain map was produced using the ARGUS system. A section along the cup profile was taken from the top of the cup wall to its bottom to obtain the distribution of major and minor strains. FIG. 4 shows a plot of the major and minor strain distribution over a sample deformed cup surface along a line from the cup flange up the cup wall to the top of the cup. These profiles are typical of what is observed in cup drawing.

Additional Embodiments

1. A method of painting a complex or compound curved three-dimensional surface (e.g., a Class A surface) of at least a portion or all of an article (e.g., a body part of a vehicle), said method comprising:

Providing an adhesive-backed paint film comprising a polymeric layer impregnated with a coloring pigment having one major surface coated with a protective polymeric clear coat and another major surface coated with an adhesive (e.g., a pressure sensitive adhesive). It can be desirable for the exposed major surface of the paint film (opposite the adhesive coated major surface) to be protected with a temporary and easily removable pre-mask.

Providing a relatively flat piece of sheet metal having opposite major surfaces and being made of steel, aluminum or any other desired elemental or alloyed metal.

Laminating the paint film onto a major surface of the sheet metal (e.g., with a hot melt, heat activated or pressure sensitive adhesive) to form a painted sheet metal laminate comprising a first or forming portion and a second or clamping portion. The first or forming portion is intended to be permanently or plastically deformed into a formed portion of the article having a complex or compound curved three-dimensional shape. The second or clamping portion in part or completely surrounds, or is on the periphery of, the first portion. The second or clamping portion is suitable for being clamped or otherwise secured by a compressive force.

Permanently deforming the first portion of the painted sheet metal laminate into the formed portion of the article having the complex or compound curved three-dimensional shape.

Applying an initial clamping or otherwise securing force (e.g., a compression force) for securing the second portion of the painted sheet metal laminate during an initial stage of said permanently deforming step; and Applying a later clamping or otherwise securing force (e.g., a compression force) for securing the second portion of the painted sheet metal laminate during a later stage of said permanently deforming step.

The later applied force is greater than the initially applied force.

2. The method according to embodiment 1, further comprising:

applying at least one intermediate clamping or otherwise securing force (e.g., a compression force) for securing the second portion of the painted sheet metal laminate during an initial stage of said permanently deforming step, where the at least one intermediate force is applied after the initial force and before the later force, the at least one intermediate force is greater than the initial force, and the later force is greater than the at least one intermediate force.

3. The method according to embodiment 1 or 2, wherein the initial force being applied is increased linearly to the later force before the permanent deformation of the painted sheet metal laminate is complete.

4. The method according to embodiment 1 or 2, wherein the initial force is held constant until the later force is applied.

5. The method according to any one of embodiments 1 to 4, wherein the initial force is applied until the percent completion of the permanent deformation of the painted sheet metal laminate is in the range of from about 25% to about 33.33%.

6. The method according to any one of embodiments 1 to 4, wherein the later force is not applied until the percent completion of the permanent deformation of the painted sheet metal laminate is greater than or equal to about 33.33%.

7. The method according to any one of embodiments 1 to 6, wherein the magnitude of the initial force is about 90% or less than the magnitude of the later force.

8. The method according to any one of embodiments 1 to 7, wherein the provided paint film has an exterior surface, the exterior surface of the paint film forms the exterior surface of the painted sheet metal laminate, and after the first portion is permanently deformed, the exterior surface of the complex or compound curved three-dimensional shape is a Class A surface.

9. The method according to any one of embodiments 1 to 8, wherein the article is a body part of a vehicle.

10. The method according to any one of embodiments 1 to 9, wherein the paint film is an adhesive-backed paint film comprising a polymeric layer impregnated with a coloring pigment having one major surface optionally coated with a protective polymeric clear coat, and another major surface coated with an adhesive (e.g., a pressure sensitive adhesive).

11. The method according to embodiment 10, wherein the paint film has an exposed major surface that is protected with a temporary and easily removable pre-mask.

12. The method according to any one of embodiments 1 to 11, wherein the sheet metal is a relatively flat piece of sheet metal.

13. The method according to any one of embodiments 1 to 12, wherein each applied force is a clamping or otherwise compression force.

14. The method according to any one of embodiments 1 to 13, wherein said step of permanently deforming the first portion of the painted sheet metal laminate is accomplished, at least in part, by using a punch and a die cavity, with the clearance between the punch and die cavity is in the range of from about 180% up to and including about 205% of the total thickness of the painted sheet metal laminate.

15. An article comprising a complex or compound curved three-dimensional surface painted according to any one of embodiments 1 to 14.

16. An article comprising a paint film laminated to a major surface of sheet metal so as to form a painted sheet metal laminate, said painted sheet metal laminate comprising a first portion and a second portion on the periphery of said first portion, with said first portion having a complex or compound curved three-dimensional shape, at least a portion of said paint film within said first portion exhibiting a tensile or stretching strain profile, indicative of that portion of said paint film having been stretched so as to be permanently deformed into the complex or compound curved three-dimensional shape, and at least a portion of said paint film within said second portion exhibiting a compressive strain profile indicative of that portion of said paint film having been held in place under compressive or clamping forces while said first portion of said painted sheet metal laminate was stretched so as to be permanently deformed into the complex or compound curved three-dimensional shape.

17. The article of embodiment 15 or 16, wherein the article is a body part of a vehicle.

Benefits from using an optimized holder force profile according to the present invention appears to be applicable to a variety of paint films. It is believed that the above teachings may apply as well to paint film laminates made with different (1) sheet metal thicknesses, (2) types of metal (e.g., different steels, aluminum, copper, alloys, etc.), (3) die cavities or openings, and/or (4) cup sizes than those used in the exemplary cup drawing process. It is also believed that the present inventive modifications to the exemplary cup drawing process are also applicable, at least generally, to other sheet metal forming operations used to produce complex or compound three dimensionally deformed paint film laminated sheet metal. In addition, there may be some benefits using a clamping force profile that includes increasing the clamping force (e.g., blank holder force) multiple times during the deformation of the paint film laminate, rather than only once as exemplified. For instance, it may be desirable to increase the clamping force (e.g., blank holder force) in 2 steps during the entire forming operation (e.g., punch stroke). For example, one clamping force profile could start with 85% of the maximum applied clamping force and then at some point during the forming operation (e.g., punch stroke) to 90% of the maximum applied force. The profile could appear as a series of increasing steps in the clamp force versus time curve. These steps could be programmed in a computer interfaced to the forming equipment (e.g., the stamping press) to execute the 'multi-step' or 'variable' clamping methodology. Thus, this invention may take on various modifications and alterations without departing from its spirit and scope. Accordingly, this invention is not limited to the above-described but is to be controlled by the limitations set forth in the following claims and any equivalents thereof.

This invention may be suitably practiced in the absence of any element not specifically disclosed herein.

All patents and patent applications cited above, including those in the Background section, are incorporated by reference into this document in total.

What is claimed is:

1. A method of painting a complex or compound curved three-dimensional surface of a portion of an article, said method comprising:
   providing a paint film;
   providing sheet metal having opposite major surfaces;
   laminating the paint film onto a major surface of the sheet metal to form a painted sheet metal laminate comprising a first portion and a second portion on the periphery of the first portion;
   permanently deforming the first portion of the painted sheet metal laminate into a formed portion of the article having a complex or compound curved three-dimensional shape;
   applying an initial force for securing the second portion of the painted sheet metal laminate during an initial stage of said permanently deforming step; and
   applying a later force for securing the second portion of the painted sheet metal laminate during a later stage of said permanently deforming step,
   wherein the later applied force is greater than the initially applied force.

2. The method according to claim 1, further comprising:
   applying at least one intermediate force for securing the second portion of the painted sheet metal laminate during an initial stage of said permanently deforming step, where the at least one intermediate force is applied after the initial force and before the later force, the at least one intermediate force is greater than the initial force, and the later force is greater than the at least one intermediate force.

3. The method according to claim 1, wherein the initial force being applied is increased linearly to the later force before the permanent deformation of the painted sheet metal laminate is complete.

4. The method according to claim 1, wherein the initial force is held constant until the later force is applied.

5. The method according to claim 1, wherein the initial force is applied until the percent completion of the permanent deformation of the painted sheet metal laminate is in the range of from about 25% to about 33.33%.

6. The method according to claim 1, wherein the later force is not applied until the percent completion of the permanent deformation of the painted sheet metal laminate is greater than or equal to about 33.33%.

7. The method according to claim 1, wherein the magnitude of the initial force is about 90% or less than the magnitude of the later force.

8. The method according to claim 1, wherein the provided paint film has an exterior surface, the exterior surface of the paint film forms the exterior surface of the painted sheet metal laminate, and after the first portion is permanently deformed, the exterior surface of the complex or compound curved three-dimensional shape is a Class A surface.

9. The method according to claim 1, wherein the article is a body part of a vehicle.

10. The method according to claim 1, wherein the paint film is an adhesive-backed paint film comprising a polymeric layer impregnated with a coloring pigment having one major surface optionally coated with a protective polymeric clear coat, and another major surface coated with an adhesive.

11. The method according to claim 10, wherein the paint film has an exposed major surface that is protected with a temporary and removable pre-mask.

12. The method according to claim 1, wherein the sheet metal is a relatively flat piece of sheet metal.

13. The method according to claim 1, wherein each applied force is a clamping or otherwise compression force.

14. The method according to claim 1, wherein said step of permanently deforming the first portion of the painted sheet metal laminate is accomplished, at least in part, by using a punch and a die cavity, with the clearance between the punch and die cavity is in the range of from about 180% up to and including about 205% of the total thickness of the painted sheet metal laminate.

* * * * *